(12) United States Patent
Blinzer et al.

(10) Patent No.: US 8,578,129 B2
(45) Date of Patent: Nov. 5, 2013

(54) INFRASTRUCTURE SUPPORT FOR ACCELERATED PROCESSING DEVICE MEMORY PAGING WITHOUT OPERATING SYSTEM INTEGRATION

(75) Inventors: Paul Blinzer, Bellevue, WA (US); Leendert Peter Van Doorn, Austin, TX (US); Gongxian Jeffrey Cheng, Toronto (CA); Elene Terry, Los Altos, CA (US); Thomas Roy Woller, Austin, TX (US); Arshad Rahman, Richmond Hill (CA)

(73) Assignees: Advanced Micro Devices, Inc., Sunnyvale, CA (US); ATI Technologies ULC, Markham, Ontario (CA)

( * ) Notice: Subject to any disclaimer, the term of this patent is extended or adjusted under 35 U.S.C. 154(b) by 167 days.

(21) Appl. No.: 13/325,282

(22) Filed: Dec. 14, 2011

(65) Prior Publication Data
US 2013/0159664 A1  Jun. 20, 2013

(51) Int. Cl.
G06F 12/00 (2006.01)
(52) U.S. Cl.
USPC .......................................... 711/206
(58) Field of Classification Search
None
See application file for complete search history.

(56) References Cited

U.S. PATENT DOCUMENTS

| | | | |
|---|---|---|---|
| 2012/0159039 A1* | 6/2012 | Kegel et al. ........................ 711/6 |
| 2012/0162234 A1* | 6/2012 | Blinzer et al. ................. 345/501 |
| 2012/0188258 A1* | 7/2012 | McCrary et al. ............... 345/502 |
| 2012/0246381 A1* | 9/2012 | Kegel et al. ........................ 711/6 |
| 2013/0155077 A1* | 6/2013 | Hartog et al. .................. 345/506 |
| 2013/0162752 A1* | 6/2013 | Herz et al. .................. 348/14.08 |

* cited by examiner

*Primary Examiner* — Hiep Nguyen
(74) *Attorney, Agent, or Firm* — Sterne, Kessler, Goldstein & Fox P.L.L.C.

(57) ABSTRACT

In a CPU, the CPU having multiple CPU cores, each core having a first machine specific register, a second machine specific register, and microcode which when executed causes a write notification to be issued to the physical address contained in the second machine specific register; receiving in the first machine specific register of a CPU core, a physical page table/page directory base address, receiving in the second machine specific register of the CPU core, a physical address pointing to a location controlled by the IOMMUv2, determining that a control register of the CPU core has been updated, and responsive to the determination that the control register has been updated, executing microcode in the CPU core that causes a write notification to be issued to the physical address contained in the second machine specific register, wherein the physical address is able to receive writes that affect IOMMUv2 page table invalidations.

20 Claims, 4 Drawing Sheets

INFRASTRUCTURE SUPPORT FOR ACCELERATED PROCESSING DEVICE MEMORY PAGING WITHOUT OPERATING SYSTEM INTEGRATION

BACKGROUND

1. Field of the Invention

The present invention is generally directed to computer systems. More particularly, the present invention is directed to processor architecture.

2. Background Art

The desire to use a graphics processing unit (GPU) for general computation has become much more pronounced recently due to the GPU's exemplary performance per unit power and/or cost. The computational capabilities for GPUs, generally, have grown at a rate exceeding that of the corresponding central processing unit (CPU) platforms. This growth, coupled with the explosion of the mobile computing market (e.g., notebooks, mobile smart phones, tablets, etc.) and its necessary supporting server/enterprise systems, has been used to provide a specified quality of desired user experience. Consequently, the combined use of CPUs and GPUs for executing workloads with data parallel content is becoming a volume technology.

However, GPUs have traditionally operated in a constrained programming environment, available primarily for the acceleration of graphics. These constraints arose from the fact that GPUs did not have as rich a programming ecosystem as CPUs. Their use, therefore, has been mostly limited to two dimensional (2D) and three dimensional (3D) graphics and a few leading edge multimedia applications, which are already accustomed to dealing with graphics and video application programming interfaces (APIs).

With the advent of multi-vendor supported OpenCL® and DirectCompute®, standard APIs and supporting tools, the limitations of the GPUs in traditional applications has been extended beyond traditional graphics. Although OpenCL and DirectCompute are a promising start, there are many hurdles remaining to creating an environment and ecosystem that allows the combination of a CPU and a GPU to be used as fluidly as the CPU for most programming tasks.

Existing computing systems often include multiple processing devices. For example, some computing systems include both a CPU and a GPU on separate chips (e.g., the CPU might be located on a motherboard and the APD might be located on a graphics card) or in a single chip package. Both of these arrangements, however, still include significant challenges associated with (i) separate memory systems, (ii) efficient scheduling, (iii) providing quality of service (QoS) guarantees between processes, (iv) programming model, and (v) compiling to multiple target instruction set architectures (ISAs)—all while minimizing power consumption.

For example, the discrete chip arrangement forces system and software architects to utilize chip to chip interfaces for each processor to access memory. While these external interfaces (e.g., chip to chip) negatively affect memory latency and power consumption for cooperating heterogeneous processors, the separate memory systems (i.e., separate address spaces) and driver managed shared memory create overhead that becomes unacceptable for fine grain offload.

Both the discrete and single chip arrangements can limit the types of commands that can be sent to the GPU for execution. By way of example, computational commands (e.g., physics or artificial intelligence commands) often should not be sent to the GPU for execution. This performance-based limitation exists because the CPU may relatively quickly require the results of the operations performed by these computational commands. However, because of the high overhead of dispatching work to the GPU in current systems and the fact that these commands may have to wait in line for other previously-issued commands to be executed first, the latency incurred by sending computational commands to the GPU is often unacceptable.

Given that a traditional GPU may not efficiently execute some computational commands, the commands must then be executed within the CPU. Having to execute the commands on the CPU increases the processing burden on the CPU and can hamper overall system performance.

Although GPUs provide excellent opportunities for computational offloading, traditional GPUs may not be suitable for system-software-driven process management that is desired for efficient operation in some multi-processor environments. These limitations can create several problems.

For example, since processes cannot be efficiently identified and/or preempted, a rogue process can occupy the GPU hardware for arbitrary amounts of time. In other cases, the ability to context switch off the hardware is severely constrained—occurring at very coarse granularity and only at a very limited set of points in a program's execution. This constraint exists because saving the necessary architectural and microarchitectural states for restoring and resuming a process is not supported. Lack of support for precise exceptions prevents a faulted job from being context switched out and restored at a later point, resulting in lower hardware usage as the faulted threads occupy hardware resources and sit idle during fault handling.

SUMMARY OF EMBODIMENTS

What is needed is an improved combined CPU/GPU architecture. Additionally, an architecture which does not require any or significant changes to legacy operating systems would be desirable.

Certain embodiments of the present invention provide a CPU and GPU which share a unified address space and the combined CPU/GPU architecture includes infrastructure between the cores of the CPU and the I/O Memory Management Unit of the GPU. Also provided in certain embodiments of the present invention is an improved infrastructure that provides notification and control information flow to enable the use of the I/O Memory Management Unit of the GPU for the unified address space without requiring changes to legacy operating systems.

Although GPUs, accelerated processing units (APUs), and general purpose use of the graphics processing unit (GPGPU) are commonly used terms in this field, the expression "accelerated processing device (APD)" is considered to be a broader expression. For example, APD refers to any cooperating collection of hardware and/or software that performs those functions and computations associated with accelerating graphics processing tasks, data parallel tasks, or nested data parallel tasks in an accelerated manner compared to conventional CPUs, conventional GPUs, software and/or combinations thereof.

One embodiment of the present invention provides a system including a shader core configured to process a first set of instructions and a command processor configured for interrupting processing of the first set of instructions. The shader core is configured to save a context state associated with the first set of instructions after the interrupting, and process a second set of instructions after the context state has been saved.

Methods and apparatus are provided, as an aspect of a combined CPU/GPU architecture system, for operating the combined CPU/GPU architecture system with a legacy operating system that does not provide support for GPU memory paging.

It is noted, consistent with the definition of accelerated processing device (APD) provided above, that methods and apparatus are provided, as an aspect of a combined CPU/API) architecture system, for operating the combined CPU/APD architecture system with a legacy operating system that does not provide support for APD memory paging.

BRIEF DESCRIPTION OF THE DRAWINGS/FIGURES

DETAILED DESCRIPTION

Figure 1A:
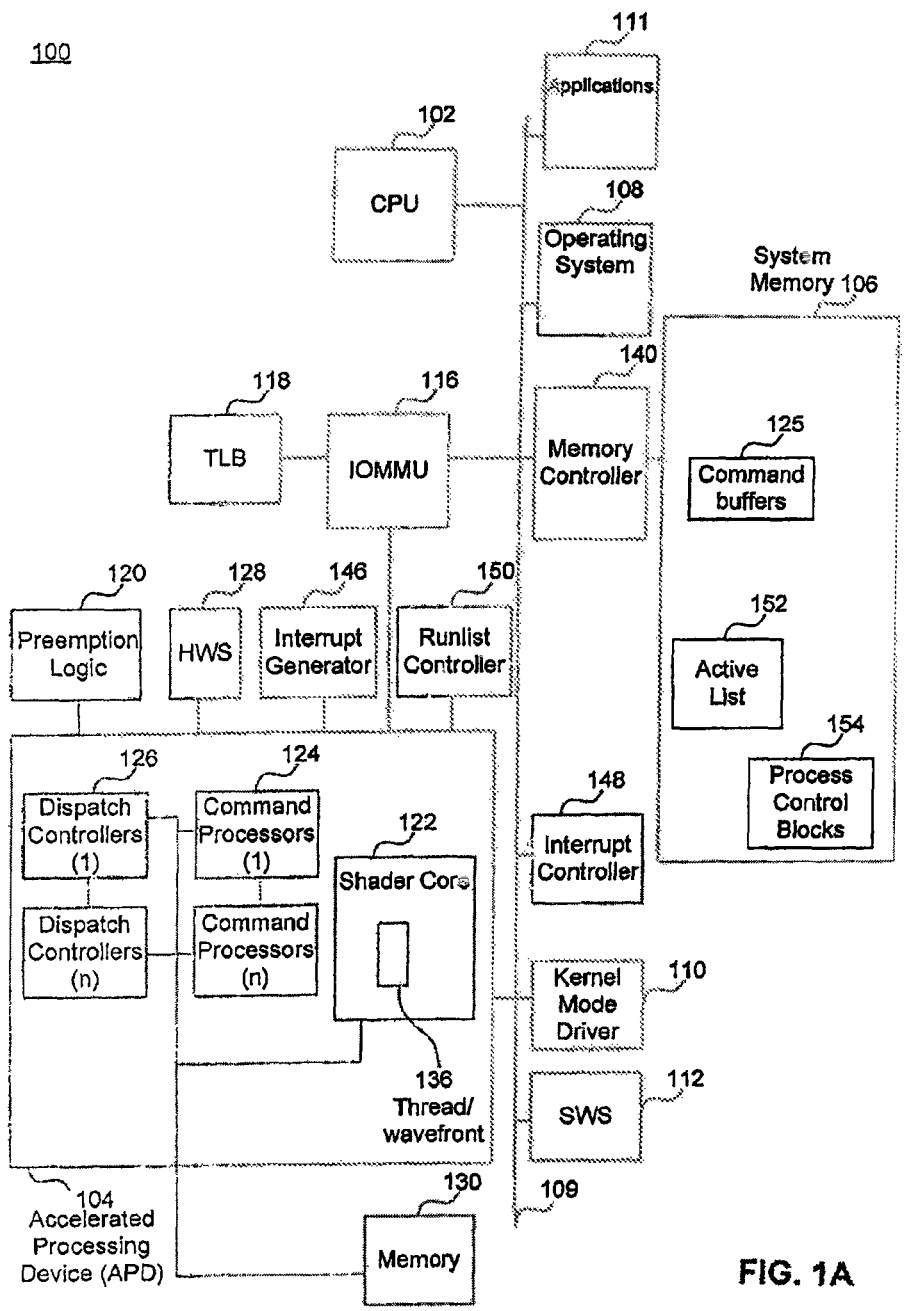
FIG. 1A is an illustrative block diagram of a processing system in accordance with embodiments of the present invention.

Generally, in a combined CPU/APD architecture where the CPU and APD share a unified address space, the combined CPU/APD architecture requires infrastructure between the cores of the CPU and the I/O Memory Management Unit managing the APD virtual address space so as to provide notification and control information flow for the unified address space updates as managed by the Operating System. In conventional Operating System designs, those managed updates are only sent to the CPU function, ignoring the IOMMU functionality. In other words, because present operating systems do not provide support for the I/O Memory Management Unit controlling the APD virtual address space, additional infrastructure has to be introduced to allow the unpinned memory access from APD/SIMD. Support in the form of hardware, microcode, and/or firmware may be provided in accordance with the present invention so that the I/O Memory Management Unit of the APD can track page table invalidations that affect its process address space for legacy Operating System designs.

One exemplary embodiment of the present invention includes, a CPU of the combined CPU/APD architecture system, the CPU having multiple CPU cores, each core having a first machine specific register for receiving a physical page table/page directory base address, a second machine specific register for receiving a physical address pointing to a well-defined location that controls an IOMMU that is communicatively coupled to an APD, and microcode which when executed causes a write notification to be issued to the physical address contained in the second machine specific register; receiving in the first machine specific register of a CPU core, a physical page table/page directory base address, receiving in the second machine specific register of the CPU core, a physical address pointing to a location that controls the IOMMU, determining that a control register of the CPU core has been updated, and responsive to the determination that the control register has been updated, executing microcode in the CPU core that causes a write notification to be issued to the physical address contained in the second machine specific register, wherein the physical address is able to receive writes that affect IOMMU Page Table invalidations.

Terminology

The acronym APU refers to Accelerated Processing Unit. As used herein, an APU is a computing device that includes one or more scalar computational resources, one or more single instruction multiple data (SIMD) computational resources. Certain embodiments of an APU may additionally include an Input/Output Memory Management Unit that couples both the scalar and the SIMD computational resources to a memory that is external to the APU.

The acronym GPU refers to a Graphics Processing Unit. Although "GPU" is a commonly used term in this field, the expression "graphics processing device" is considered to be a broader expression that refers to any cooperating collection of hardware and/or software that performs those functions and computations associated with accelerating a graphics processing task as compared to a scalar (i.e., non-vector) computational resource such as a conventional CPU. The scope of the expression "graphics processing device" comprehends GPU. Further, as explained above, the acronym APD refers to an Accelerated Processing Device, and this expression refers to any cooperating collection of hardware and/or software that performs those functions and computations associated with accelerating graphics processing tasks, data parallel tasks, or nested data parallel tasks in an accelerated manner with respect to resources such as conventional CPUs, conventional GPUs, and/or combinations thereof. The scope of the expression "accelerated processing device" includes the expression "graphics processing device".

CR3 refers to a control register in the x86 architecture that is used in translating virtual addresses to physical addresses.

CR4 refers to a control register in the x86 architecture that includes bits used to control certain aspects of virtual addressing.

CPU refers to central processing unit. A microprocessor is sometimes referred to as a CPU.

The acronym FPU refers to Floating Point Unit.

INVLPG refers to an x86 instruction, Invalidate TLB Entry.

INVLPGA refers to an x86 instruction, Invalidate TLB entry in a specified ASID.

The acronym IOMMU refers to an Input/Output Memory Management Unit. The IOMMU style of MMU can be characterized as a multi-context MMU with remote control and notification mechanisms. The IOMMU functionality may be present as a distinct device in the system or may be associated with specific parent components. The IOMMU typically includes a TLB that is architecturally hidden, a table walker, a device table (in system memory), a set of configuration registers, a command/event/page fault queue (in system memory) and an MSI interrupt mechanism. The device table in system memory maps a BDF, PASID two-tuple to a Page Table base pointer. BDF corresponds to a guest address space, and the PASID corresponds to a process address space. The configuration registers are used to set up interrupts and IOMMU features. In an illustrative IOMMU in accordance with the present invention, the IOMMU hardware supports nested paging with a fully compatible x86 page table at the OS level. This may be referred to herein as an IOMMUv2. It is noted that, in the context of the present disclosure, the IOMMU is not an APD related device per se, but rather a system component of its own that is leveraged for the purpose of memory management for the APD.

The acronym KMD refers to Kernel Mode Driver.

The acronym MSR refers to Machine Specific Register (sometimes referred to as a Model Specific Register). The MSR stores information related to the processor in which it resides.

MWAIT is an instruction in the x86 instruction set architecture.

The acronym OS refers to operating system.

The acronym PCI refers to Peripheral Component Interconnect.

The acronym PnP refers to Plug and Play, a technology in which devices or boards may be added to the computer system and automatically configured.

The acronym PTBA refers to Page Table Base Address.

The acronym SIMD refers to single instruction multiple data.

The acronym TLB refers to Translation Lookaside Buffer

The acronym VMM refers to virtual memory manager.

Pinned memory refers to a physical memory region the contents of which are not subject to being paged out as long as that memory is pinned. Generally, since the content of the pinned memory region is known to have not been paged out, accessing a pinned memory does not result in a page fault.

XSAVE/XRSTR refer to x86 instructions.

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, stricture, or characteristic is described in connection with an embodiment, it is submitted that it is within the knowledge of one skilled in the art to affect such feature, structure, or characteristic in connection with other embodiments whether or not explicitly described.

The term "embodiments of the invention" does not require that all embodiments of the invention include the discussed feature, advantage or mode of operation. Alternate embodiments may be devised without departing from the scope of the invention, and well-known elements of the invention may not be described in detail or may be omitted so as not to obscure the relevant details of the invention. In addition, the terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Basic Combined CPU/APD System Architecture

FIG. 1A is an exemplary illustration of a unified computing system 100 including two processors, a CPU 102 and an APD 104. CPU 102 can include one or more single or multi core CPUs. In one embodiment of the present invention, the system 100 is formed on a single silicon die or package, combining CPU 102 and APD 104 to provide a unified programming and execution environment. This environment enables the APD 104 to be used as fluidly as the CPU 102 for some programming tasks. However, it is not an absolute requirement of this invention that the CPU 102 and APD 104 be formed on a single silicon die. In some embodiments, it is possible for them to be formed separately and mounted on the same or different substrates.

In one example, system 100 also includes a memory 106, an operating system 108, and a communication infrastructure 109. The operating system 108 and the communication infrastructure 109 are discussed in greater detail below.

The system 100 also includes a kernel mode driver (KMD) 110, a software scheduler (SWS) 112, and a memory management unit 116, such as input/output memory management unit (IOMMU). Components of system 100 can be implemented as hardware, firmware, software, or any combination thereof. A person of ordinary skill in the art will appreciate that system 100 may include one or more software, hardware, and firmware components in addition to, or different from, that shown in the embodiment shown in FIG. 1A.

In one example, a driver, such as KMD 110, typically communicates with a device through a computer bus or communications subsystem to which the hardware connects. When a calling program invokes a routine in the driver, the driver issues commands to the device. Once the device sends data back to the driver, the driver may invoke routines in the original calling program. In one example, drivers are hardware-dependent and operating-system-specific. They usually provide the interrupt handling required for any necessary asynchronous time-dependent hardware interface.

Device drivers, particularly on modern Microsoft Windows® platforms, can run in kernel-mode (Ring 0) or in user-mode (Ring 3). The primary benefit of running a driver in user mode is improved stability, since a poorly written user mode device driver cannot crash the system by overwriting kernel memory. On the other hand, user/kernel-mode transitions usually impose a considerable performance overhead, thereby prohibiting user mode-drivers for low latency and high throughput requirements. Kernel space can be accessed by user module only through the use of system calls. End user programs like the UNIX shell or other GUI based applications are part of the user space. These applications interact with hardware through kernel supported functions.

CPU 102 can include (not shown) one or more of a central processor, field programmable gate array (FPGA), application specific integrated circuit (ASIC), or digital signal processor (DSP). CPU 102, for example, executes the control logic, including the operating system 108, KMD 110, SWS 112, and applications 111, that control the operation of computing system 100. In this illustrative embodiment, CPU 102, according to one embodiment, initiates and controls the execution of applications 111 by, for example, distributing the processing associated with that application across the CPU 102 and other processing resources, such as the APD 104.

APD 104, among other things, executes commands and programs for selected functions, such as graphics operations and other operations that may be, for example, particularly suited for parallel processing. In general, APD 104 can be frequently used for executing graphics pipeline operations, such as pixel operations, geometric computations, and rendering an image to a display. In various embodiments of the present invention, APD 104 can also execute compute processing operations (e.g., those operations unrelated to graphics such as, for example, video operations, physics simulations, computational fluid dynamics, etc.), based on commands or instructions received from CPU 102.

For example, commands can be considered as special instructions that are not typically defined in the instruction set architecture (ISA). A command may be executed by a special processor such a dispatch processor, command processor, or network controller. On the other hand, instructions can be considered, for example, a single operation of a processor within a computer architecture. In one example, when using two sets of ISAs, some instructions are used to execute x86 programs and some instructions are used to execute kernels on an APD compute unit.

In an illustrative embodiment, CPU 102 transmits selected commands to APD 104. These selected commands can include graphics commands and other commands amenable to parallel execution. These selected commands, that can also include compute processing commands, can be executed substantially independently from CPU 102.

APD 104 can include its own compute units (not shown), such as, but not limited to, one or more SIMD processing cores. As referred to herein, a SIMD is a pipeline, or programming model, where a kernel is executed concurrently on multiple processing elements each with its own data and a shared program counter. All processing elements execute an identical set of instructions. The use of predication enables work-items to participate or not for each issued command.

In one example, each APD 104 compute unit can include one or more scalar and/or vector floating-point units and/or arithmetic and logic units (ALUs). The APD compute unit can also include special purpose processing units (not shown), such as inverse-square root units and sine/cosine units. In one example, the APD compute units are referred to herein collectively as shader core 122.

Having one or more SIMDs, in general, makes APD 104 ideally suited for execution of data-parallel tasks such as those that are common in graphics processing.

Some graphics pipeline operations, such as pixel processing, and other parallel computation operations, can require that the same command stream or compute kernel be performed on streams or collections of input data elements. Respective instantiations of the same compute kernel can be executed concurrently on multiple compute units in shader core 122 in order to process such data elements in parallel. As referred to herein, for example, a compute kernel is a function containing instructions declared in a program and executed on an APD compute unit. This function is also referred to as a kernel, a shader, a shader program, or a program.

In one illustrative embodiment, each compute unit (e.g., SIMD processing core) can execute a respective instantiation of a particular work-item to process incoming data. A work-item is one of a collection of parallel executions of a kernel invoked on a device by a command. A work-item can be executed by one or more processing elements as part of a work-group executing on a compute unit.

A work-item is distinguished from other executions within the collection by its global ID and local ID. In one example, a subset of work-items in a workgroup that execute simultaneously together on a SIMD can be referred to as a wavefront 136. The width of a wavefront is a characteristic of the hardware of the compute unit (e.g., SIMD processing core). As referred to herein, a workgroup is a collection of related work-items that execute on a single compute unit. The work-items in the group execute the same kernel and share local memory and work-group barriers.

In the exemplary embodiment, all wavefronts from a workgroup are processed on the same SIMD processing core. Instructions across a wavefront are issued one at a time, and when all work-items follow the same control flow, each work-item executes the same program. Wavefronts can also be referred to as warps, vectors, or threads.

An execution mask and work-item predication are used to enable divergent control flow within a wavefront, where each individual work-item can actually take a unique code path through the kernel. Partially populated wavefronts can be processed when a full set of work-items is not available at wavefront start time. For example, shader core 122 can simultaneously execute a predetermined number of wavefronts 136, each wavefront 136 comprising a multiple work-items.

Within the system 100, APD 104 includes its own memory, such as graphics memory 130 (although memory 130 is not limited to graphics only use). Graphics memory 130 provides a local memory for use during computations in APD 104. Individual compute units (not shown) within shader core 122 can have their own local data store (not shown). In one embodiment, APD 104 includes access to local graphics memory 130, as well as access to the memory 106. In another embodiment, APD 104 can include access to dynamic random access memory (DRAM) or other such memories (not shown) attached directly to the APD 104 and separately from memory 106.

In the example shown, APD 104 also includes one or (n) number of command processors (CPs) 124. CP 124 controls the processing within APD 104. CP 124 also retrieves commands to be executed from command buffers 125 in memory 106 and coordinates the execution of those commands on APD 104.

In one example, CPU 102 inputs commands based on applications 111 into appropriate command buffers 125. As referred to herein, an application is the combination of the program parts that will execute on the compute units within the CPU and APD.

A plurality of command buffers 125 can be maintained with each process scheduled for execution on the APD 104.

CP 124 can be implemented in hardware, firmware, or software, or a combination thereof. In one embodiment, CP 124 is implemented as a reduced instruction set computer (RISC) engine with microcode for implementing logic including scheduling logic.

APD 104 also includes one or "n" number of dispatch controllers (DCs) 126. In the present application, the term dispatch refers to a command executed by a dispatch controller that uses the context state to initiate the start of the execution of a kernel for a set of work groups on a set of compute units. DC 126 includes logic to initiate workgroups in the shader core 122. In some embodiments, DC 126 can be implemented as part of CP 124.

System 100 also includes a hardware scheduler (HWS) 128 for selecting a process from a run list 150 for execution on APD 104. HWS 128 can select processes from run list 150 using round robin methodology, priority level, or based on other scheduling policies. The priority level, for example, can be dynamically determined. HWS 128 can also include functionality to manage the run list 150, for example, by adding new processes and by deleting existing processes from run-list 150. The run list management logic of HWS 128 is sometimes referred to as a run list controller (RLC).

In various embodiments of the present invention, when HWS 128 initiates the execution of a process from run list 150, CP 124 begins retrieving and executing commands from the corresponding command buffer 125. In some instances, CP 124 can generate one or more commands to be executed within APD 104, which correspond with commands received from CPU 102. In one embodiment, CP 124, together with other components, implements a prioritizing and scheduling of commands on APD 104 in a manner that improves or maximizes the utilization of the resources of APD 104 and/or system 100.

APD 104 can have access to, or may include, an interrupt generator 146. Interrupt generator 146 can be configured by APD 104 to interrupt the operating system 108 when interrupt events, such as page faults, are encountered by APD 104. For example, APD 104 can rely on interrupt generation logic within IOMMU 116 to create the page fault interrupts noted above.

APD 104 can also include preemption and context switch logic 120 for preempting a process currently running within shader core 122. Context switch logic 120, for example, includes functionality to stop the process and save its current state (e.g., shader core 122 state, and CP 124 state).

As referred to herein, the term state can include an initial state, an intermediate state, and/or a final state. An initial state is a starting point for a machine to process an input data set according to a programming order to create an output set of data. There is an intermediate state, for example, that needs to be stored at several points to enable the processing to make forward progress. This intermediate state is sometimes stored to allow a continuation of execution at a later time when interrupted by some other process. There is also final state that can be recorded as part of the output data set.

Preemption and context switch logic 120 can also include logic to context switch another process into the APD 104. The functionality to context switch another process into running on the APD 104 may include instantiating the process, for example, through the CP 124 and DC 126 to run on APD 104, restoring any previously saved state for that process, and starting its execution.

Memory 106 can include non-persistent memory such as DRAM (not shown). Memory 106 can store, e.g., processing logic instructions, constant values, and variable values during execution of portions of applications or other processing logic. For example, in one embodiment, parts of control logic to perform one or more operations on CPU 102 can reside within memory 106 during execution of the respective portions of the operation by CPU 102.

During execution, respective applications, operating system functions, processing logic commands, and system software can reside in memory 106. Control logic commands fundamental to operating system 108 will generally reside in memory 106 during execution. Other software commands, including, for example, kernel mode driver 110 and software scheduler 112 can also reside in memory 106 during execution of system 100.

In this example, memory 106 includes command buffers 125 that are used by CPU 102 to send commands to APD 104. Memory 106 also contains process lists and process information (e.g., active list 152 and process control blocks 154). These lists, as well as the information, are used by scheduling software executing on CPU 102 to communicate scheduling information to APD 104 and/or related scheduling hardware. Access to memory 106 can be managed by a memory controller 140, which is coupled to memory 106. For example, requests from CPU 102, or from other devices, for reading from or for writing to memory 106 are managed by the memory controller 140.

Referring back to other aspects of system 100, IOMMU 116 is a multi-context memory management unit.

As used herein, context can be considered the environment within which the kernels execute and the domain in which synchronization and memory management is defined. The context includes a set of devices, the memory accessible to those devices, the corresponding memory properties and one or more command-queues used to schedule execution of a kernel(s) or operations on memory objects.

Referring back to the example shown in FIG. 1A, IOMMU 116 includes logic to perform virtual to physical address translation for memory page access for devices including APD 104. IOMMU 116 may also include logic to generate interrupts, for example, when a page access by a device such as APD 104 results in a page fault. IOMMU 116 may also include, or have access to, a translation lookaside buffer (TLB) 118. TLB 118, as an example, can be implemented in a content addressable memory (CAM) to accelerate translation of logical (i.e., virtual) memory addresses to physical memory addresses for requests made by APD 104 for data in memory 106.

In the example shown, communication infrastructure 109 interconnects the components of system 100 as needed. Communication infrastructure 109 can include (not shown) one or more of a peripheral component interconnect (PCI) bus, extended PCI (PCI-E) bus, advanced microcontroller bus architecture (AMBA) bus, advanced graphics port (AGP), or other such communication infrastructure. Communications infrastructure 109 can also include an Ethernet, or similar network, or any suitable physical communications infrastructure that satisfies an application's data transfer rate requirements. Communication infrastructure 109 includes the functionality to interconnect components including components of computing system 100.

In this example, operating system 108 includes functionality to manage the hardware components of system 100 and to provide common services. In various embodiments, operating system 108 can execute on CPU 102 and provide common services. These common services can include, for example, scheduling applications for execution within CPU 102, fault management, interrupt service, as well as processing the input and output of other applications.

In some embodiments, based on interrupts generated by an interrupt controller, such as interrupt controller 148, operating system 108 invokes an appropriate interrupt handling routine. For example, upon detecting a page fault interrupt, operating system 108 may invoke an interrupt handler to initiate loading of the relevant page into memory 106 and to update corresponding page tables.

Operating system 108 may also include functionality to protect system 100 by ensuring that access to hardware components is mediated through operating system managed kernel functionality. In effect, operating system 108 ensures that applications, such as applications 111, run on CPU 102 in user space. Operating system 108 also ensures that applications 111 invoke kernel functionality provided by the operating system to access hardware and/or input/output functionality.

By way of example, applications 111 include various programs or commands to perform user computations that are also executed on CPU 102. CPU 102 can seamlessly send selected commands for processing on the APD 104.

In one example, KMD 110 implements an application program interface (API) through which CPU 102, or applications executing on CPU 102 or other logic, can invoke APD 104 functionality. For example, KMD 110 can enqueue commands from CPU 102 to command buffers 125 from which APD 104 will subsequently relieve the commands. Additionally, KMD 110 can, together with SWS 112, perform scheduling of processes to be executed on APD 104. SWS 112, for example, can include logic to maintain a prioritized list of processes to be executed on the APD.

In other embodiments of the present invention, applications executing on CPU 102 can entirely bypass KMD 110 when enqueuing commands.

In some embodiments, SWS 112 maintains an active list 152 in memory 106 of processes to be executed on APD 104, SWS 112 also selects a subset of the processes in active list 152 to be managed by HWS 128 in the hardware. Information relevant for running each process on APD 104 is communicated from CPU 102 to APD 104 through process control blocks (PCB) 154.

Processing logic for applications, operating system, and system software can include commands specified in a programming language such as C and/or in a hardware description language such as Verilog, RTL, or netlists, to enable ultimately configuring a manufacturing process through the generation of maskworks/photomasks to generate a hardware device embodying aspects of the invention described herein.

A person of skill in the art will understand, upon reading this description, that computing system 100 can include more or fewer components than shown in FIG. 1A. For example, computing system 100 can include one or more input interfaces, non-volatile storage, one or more output interfaces, network interfaces, and one or more displays or display interfaces.

Figure 1B:
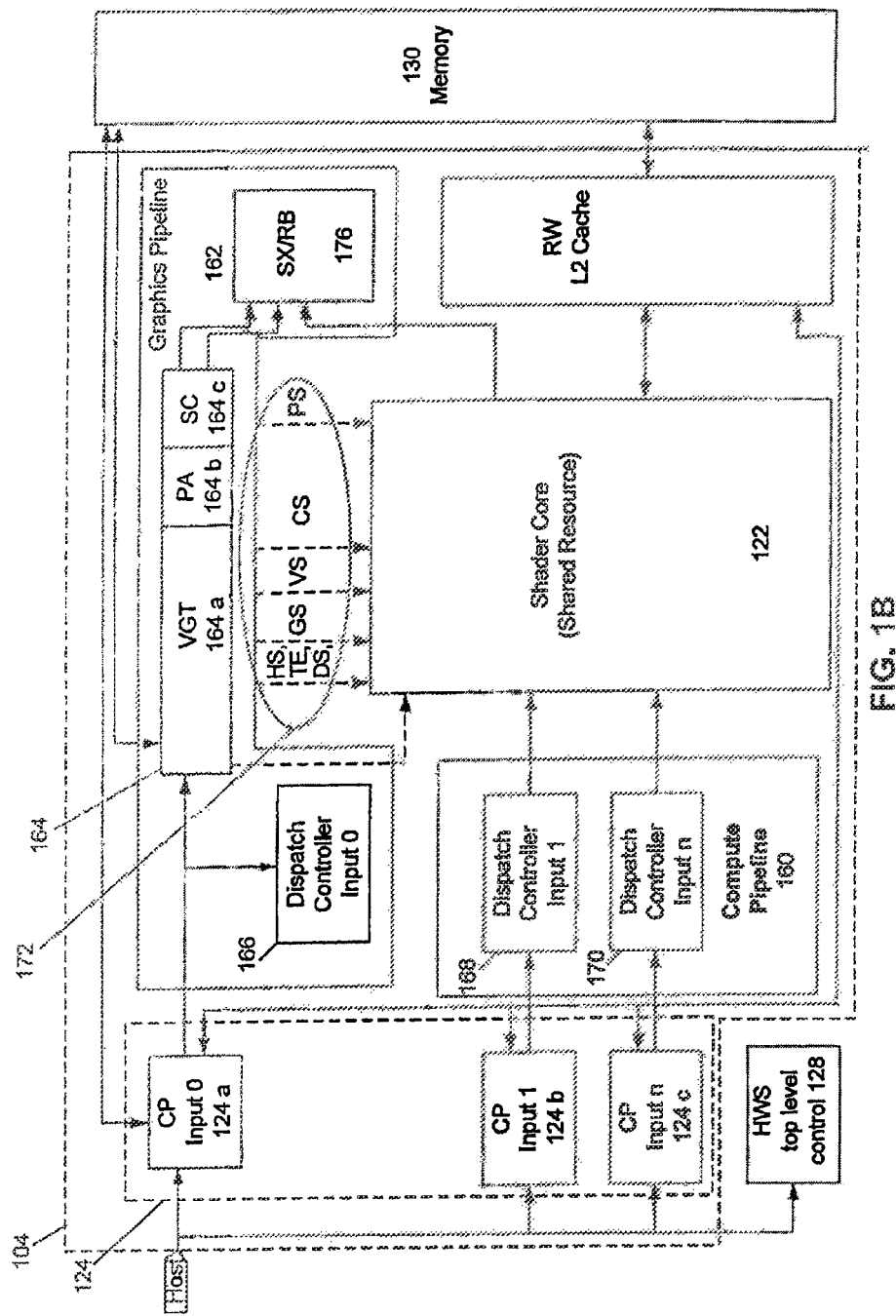
FIG. 1B is an illustrative block diagram of the APD illustrated in FIG. 1A.

FIG. 1B is an embodiment showing a more detailed illustration of APD 104 shown in FIG. 1A. In FIG. 1B, CP 124 can include CP pipelines 124a, 124b, and 124c. CP 124 can be configured to process the command lists that are provided as inputs from command buffers 125, shown in FIG. 1A. In the exemplary operation of FIG. 1B, CP input 0 (124a) is responsible for driving commands into a graphics pipeline 162. CP inputs 1 and 2 (124b and 124c) forward commands to a compute pipeline 160. Also provided is a controller mechanism 166 for controlling operation of HWS 128.

In FIG. 1B, graphics pipeline 162 can include a set of blocks, referred to herein as ordered pipeline 164. As an example, ordered pipeline 164 includes a vertex group translator (VGT) 164a, a primitive assembler (PA) 164b, a scan converter (SC) 164c, and a shader-export, render-back unit (SX/RB) 176. Each block within ordered pipeline 164 may represent a different stage of graphics processing within graphics pipeline 162. Ordered pipeline 164 can be a fixed function hardware pipeline. Other implementations can be used that would also be within the spirit and scope of the present invention.

Although only a small amount of data may be provided as an input to graphics pipeline 162, this data will be amplified by the time it is provided as an output from graphics pipeline 162. Graphics pipeline 162 also includes DC 166 for counting through ranges within work-item groups received from CP pipeline 124a. Compute work submitted through DC 166 is semi-synchronous with graphics pipeline 162.

Compute pipeline 160 includes shader DCs 168 and 170. Each of the DCs 168 and 170 is configured to count through compute ranges within work groups received from CP pipelines 124b and 124c.

The DCs 166, 168, and 170, illustrated in FIG. 1B, receive the input ranges, break the ranges down into workgroups, and then forward the workgroups to shader core 122.

Since graphics pipeline 162 is generally a fixed function pipeline, it is difficult to save and restore its state, and as a result, the graphics pipeline 162 is difficult to context switch. Therefore, in most cases context switching, as discussed herein, does not pertain to context switching among graphics processes. An exception is for graphics work in shader core 122, which can be context switched.

After the processing of work within graphics pipeline 162 has been completed, the completed work is processed through a render back unit 176, which does depth and color calculations, and then writes its final results to memory 130.

Shader core 122 can be shared by graphics pipeline 162 and compute pipeline 160. Shader core 122 can be a general processor configured to run wavefronts. In one example, all work within compute pipeline 160 is processed within shader core 122. Shader core 122 runs programmable software code and includes various forms of data, such as state data.

A disruption in the QoS occurs when all work-items are unable to access APD resources. Embodiments of the present invention facilitate efficiently and simultaneously launching two or more tasks to resources within APD 104, enabling all work-items to access various APD resources. In one embodiment, an APD input scheme enables all work-items to have access to the APD's resources in parallel by managing the APD's workload. When the APD's workload approaches maximum levels, (e.g., during attainment of maximum I/O rates), this APD input scheme assists in that otherwise unused processing resources can be simultaneously utilized in many scenarios. A serial input stream, for example, can be abstracted to appear as parallel simultaneous inputs to the APD.

By way of example, each of the CPs 124 can have one or more tasks to submit as inputs to other resources within APD 104, where each task can represent multiple wavefronts. After a first task is submitted as an input, this task may be allowed to ramp up, over a period of time, to utilize all the APD resources necessary for completion of the task. By itself, this first task may or may not reach a maximum APD utilization threshold. However, as other tasks are enqueued and are waiting to be processed within the APD 104, allocation of the APD resources can be managed to ensure that all of the tasks can simultaneously use the APD 104, each achieving a percentage of the APD's maximum utilization. This simultaneous use of the APD 104 by multiple tasks, and their combined utilization percentages, ensures that a predetermined maximum APD utilization threshold is achieved.

An illustrative embodiment of the combined CPU/APD architecture includes a modified runtime system. An APD Memory Manager supports managing APD local memory heaps. An IOMMUv2 device driver supports the unified virtual memory model toward IO devices such as the APD. A KMD manages various graphics resources and supports interoperation. Embodiments of the present invention include a compute shader operation to unpinned memory, with support for page faulting and context switching, memory coherency between APD and CPU, and pointer-is-a-pointer semantics between the x86 CPUs and the APDs.

There are software components contained within the kernel mode space, such as the OS scheduler and the OS memory manager. The OS scheduler provides system-level implementations ranging from full APD software scheduling to full hardware scheduling, where software development and control overheads are minimized. The OS memory manager supports various memory management events, such as servicing APD page faults proxied by the IOMMUv2 device driver and performing page invalidations and associated TLB shootdowns for memory domains to synchronize with the IOMMU and APD local TLBs.

Some combined CPU/APD architecture system memory regions require access sharing between the OS memory management subsystem APIs and the combined CPU/APD architecture system memory management interface. In exemplary embodiments of the present invention, some memory regions require access sharing between Windows® Device Driver Display Model APIs and memory management. The APD hardware supports the dynamic resizing of memory heaps, as contrasted with the current model where the assignment of coherent and non-coherent memory heaps is a static allocation process at driver startup.

In other embodiments of the present invention, applications have specific requirements to be able to operate on the same physical memory as legacy WDDM APIs, without requiring a memory copy. WDDM resources and residency requirements are based upon the WDDM command buffer references. Dispatch commands that reference these WDDM resources require a dummy synchronization WDDM command buffer. The residency is controlled through the KMD driver, which effectively allows the KMD to provide a memory aliasing. This design simplifies the memory management provided that a single KMD manages all of these heaps. It is noted that WDDM is Windows-specific and that the present invention is not limited to the Windows operating system environment.

More specifically, embodiments of the present invention provide methods and apparatus to support the IOMMUv2 and the unpinned memory access from the APD/SIMD without OS integration.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

Unified Address Space for Combined CPU/APD Architecture System

A unified address space is defined across the CPU and APD devices in a system in accordance with the combined CPU/APD architecture of the present invention. The devices compliant with this architecture support virtual address translation via IOMMU, and consequently, a pointer can be freely passed between devices and the architecture ensures that the virtual address pointers resolve to the same physical address. The unified address space includes discrete APD devices in addition to APUs or other device classes sharing in the unified virtual memory model.

In an illustrative embodiment of the present invention, to enable the unified address space, the IOMMU supports full x86 page tables to allow x86 user code and APD code to share the same page tables. Each APD context corresponds to a standard x86 user (or supervisor) context, and each APD context participates fully in paging translations and protections. No-execute, user/supervisor, and read-only permissions as well as nested paging translations are supported by the IOMMU. APD devices are allowed to use common, well-known TLB translation caching techniques, and the Operating System or IOMMU driver is required to propagate page invalidations and page table flushes to the IOMMU device.

The unified address space removes the need for the programmer to copy data between different device memory spaces. That is, programmers can simply pass pointers Lack and forth without concern for the device boundaries. Programmers need not write the copy code, nor debug the failures when the copies are coded incorrectly. Additionally, eliminating these copy operations improves performance by reducing memory bandwidth consumption and avoids busying devices with copying. APUs, which combine CPU cores with an APD in the same socket, share the same memory interface. For APUs, a unified address space is a natural extension to allow the devices to address the already shared memory interface in a consistent manner.

The unified address space allows both the CPU and the APD to access a single large address space. This is a substantial improvement from previous architectures in which discrete APD devices could only address the memory on the graphics board.

Infrastructure to Support Memory Paging without OS Integration

In order to fully support the IOMMUv2 and the unpinned memory access from the APD/SIMD in the combined CPU/APD architecture, Operating System integration is considered a requirement, as the OS controls/maintains the page table setup of the Process Address Space (PAS) in memory for the CPU cores which the IOMMUv2 leverages to present a uniform address space to both CPU and APD.

In the course of the management of the page tables, the OS context switches between threads and processes on the CPU (taking some "off the cores"), updates the page tables, invalidates the content of the CPU's cores associated Translation Look-aside Buffers (TLBs, TLB shoot-down) and so on.

Conventionally, the prevalent OS design assumption for a specific page table infers, if no CPU core is referencing the page table, that the OS memory manager is free to change the page table entries without any farther notification or synchronization.

The IOMMUv2 is not part of that specific process for current operating systems. Support of the IOMMUv2 setup is done through a device driver that is loaded for the IOMMUv2 PCI device function and that manages IOMMUv2 functionality independently. Since the driver can not directly hook up in the aforementioned OS memory management software flow, various embodiments of the present invention provide ways to introduce notification and control information flow that enable the use of IOMMUv2 for the unified address space of the combined CPU/APD architecture without OS help.

If native OS support for IOMMUv2 is not available, a mechanism is necessary to prevent data being used by the APD from being paged out.

In the case of an operating system that does not provide native support for the use of IOMMUv2 for the unified address space of the combined CPU/APD architecture, the virtual memory management of that operating system is only aware of the CPU cores and their memory management units. (Such an operating system may be referred to herein as a legacy operating system.) Each CPU core has its own memory management unit and therefore its own view of a page directory and page table structure that provides information into mapping for the CPU. This allows the CPU to understand relationships between a virtual address that the actual software operates on, and the actual physical representation in the physical memory which is provided by the page table mapping.

The system memory contains the page table and each of the CPU cores has a reference to one or more page tables. Each page table/page directory provides a process-specific view for the application into the actual memory and provides the ability for the software to see the memory structure in a certain way as it is to hardware. The IOMMUv2 is essentially the memory management component of a CPU core as utilized by the APD.

In various embodiments of the present invention, the APD is managed by the operating system via the IOMMUv2 as if it were a CPU core because IOMMUv2 operation is locked to the Operating System controls on the CPU. The operating system understands that there is another component that needs a certain view of the memory same way as the CPU cores. As long as at least one CPU core runs a thread related to the combined CPU/APD architecture process context, the IOMMUv2 can leverage the page table invalidation information received this way to keep the virtual address strictly in sync with the CPU core.

In various embodiments of the present invention, the IOMMUv2 is "piggybacked", i.e., incorporated into one of the CPU cores. A number of mechanisms, such as but not limited to, virtualization can be used to achieve this result. For example, a Hypervisor virtualizing the CPU for a legacy OS and monitoring updates to the CR3/CR4 registers is one of the methods, another one is CPU microcode that directs the writing of status information when it receives write operations to the CR3/CR4 registers that impact the so-called TLBs. Monitoring of the appropriate CPU registers is part of various embodiments of the present invention. Both the virtualization and the microcode approaches are similar in concept at a high level, but differ in the details of their implementations.

In connection with legacy operating systems, various embodiments of the present invention leverage that which those operating systems do with CPU cores by using that information to manage the IOMMUv2.

The present invention applies to both discrete APDs and APUs (integrated CPU/APD), and it is noted that the IOMMUv2 component needs to receive the updates (not any of the APDs). The integrated or discrete APDs are simply clients of the IOMMUv2 and therefore it does not matter for the scope of the invention if one or the other is applied here.

Illustrative Embodiments

In the description of various illustrative embodiments of the present invention below, the following conditions are assumed in order to simplify the discussion.

At any given time, the IOMMUv2 is representing one PAS view to direct APD shader accesses to system memory. The IOMMUv2 page base address is directly associated with the IOMCR3 base address with at least one of the CPU cores (i.e., PAS is "resident" on at least one core). The current IOMMUv2 page address may be written to a MSR by the IOMMUv2 driver to notify microcode of the current IOMMUv2 setup. In various alternative embodiments, more than one concurrent PAS can be supported along the same management principle.

Microcode changes are introduced to notify IOMMUv2 about specific changes to the CPU page tables, TLB invalidations or when the Process Address Space is context-switched out from all the CPU cores in the system. Microcode is extending certain instructions commonly used within the page table setup, update and context switch (e.g., MOV < . . . >, CR3, XSAVE/XRSTR, . . . ) to do the notification of the IOMMUv2 control to a pre-defined address which may be set up in a Machine Specific Register by IOMMUv2 driver on PnP start and taken down on PnP stop of the driver.

For the consideration of the IOMMUv2 PAS, as long as at least one core operates in the same process address space as the IOMMUv2, IOMMUv2 will receive updates (TLB shoot-downs, etc.) based on that CPU core or cores through the Microcode-implemented notification mechanism; this may be handled by IOMMU driver based updates or by implementation extensions to the IOMMUv2 device.

If the Process Address Space is context switched out from all the cores entirely (this may be managed by refcounts), IOMMUv2 receives a notification from CPU microcode and blocks any translated APD access of system memory, regardless of the actual state of the page table. For that purpose a specific notification protocol between IOMMUv2 and APD may be established.

The APD can still make forward-progress when working on device local resources. When system resource access is processed by the APD, the APD will stall and the APD or IOMMUv2 will generate an interrupt (similar to page access fault for demand paging) and the KMD IOMMUv2 driver takes over to resolve the condition if necessary. Alternatively, the APD access stall gets resolved "automatically" when the PAS context is scheduled back in to a core by the OS scheduler (e.g., by notification through a microcode protocol to IOMMUv2 and from there to the APD).

As an illustrative implementation, one may maintain a reference count for a given IOMMUv2 PTA base that when it reaches 0 will generate the "general IOMMUv2 block" condition described herein. When the IOMMUv2 context is context switched in on a core by the OS, IOMMUv2 access is enabled again and resolved by the now-current page table content.

It is noted that various embodiments of the present invention provide a "loosely synchronous" context switch model as far as the APD/IOMMUv2 system memory access protocol is concerned. That is, rather than a tight coupling of the APD to a specific core, it ties itself to the overall "residence" of a PTA base on any of the given cores, and introduces some minor changes to the hardware and microcode level to allow for this.

Detailed Outline of Operation

The following section outlines the necessary components, where changes are needed from the current hardware design and the general control flow for the combined CPU/APD architecture relevant operations.

Figure 2:
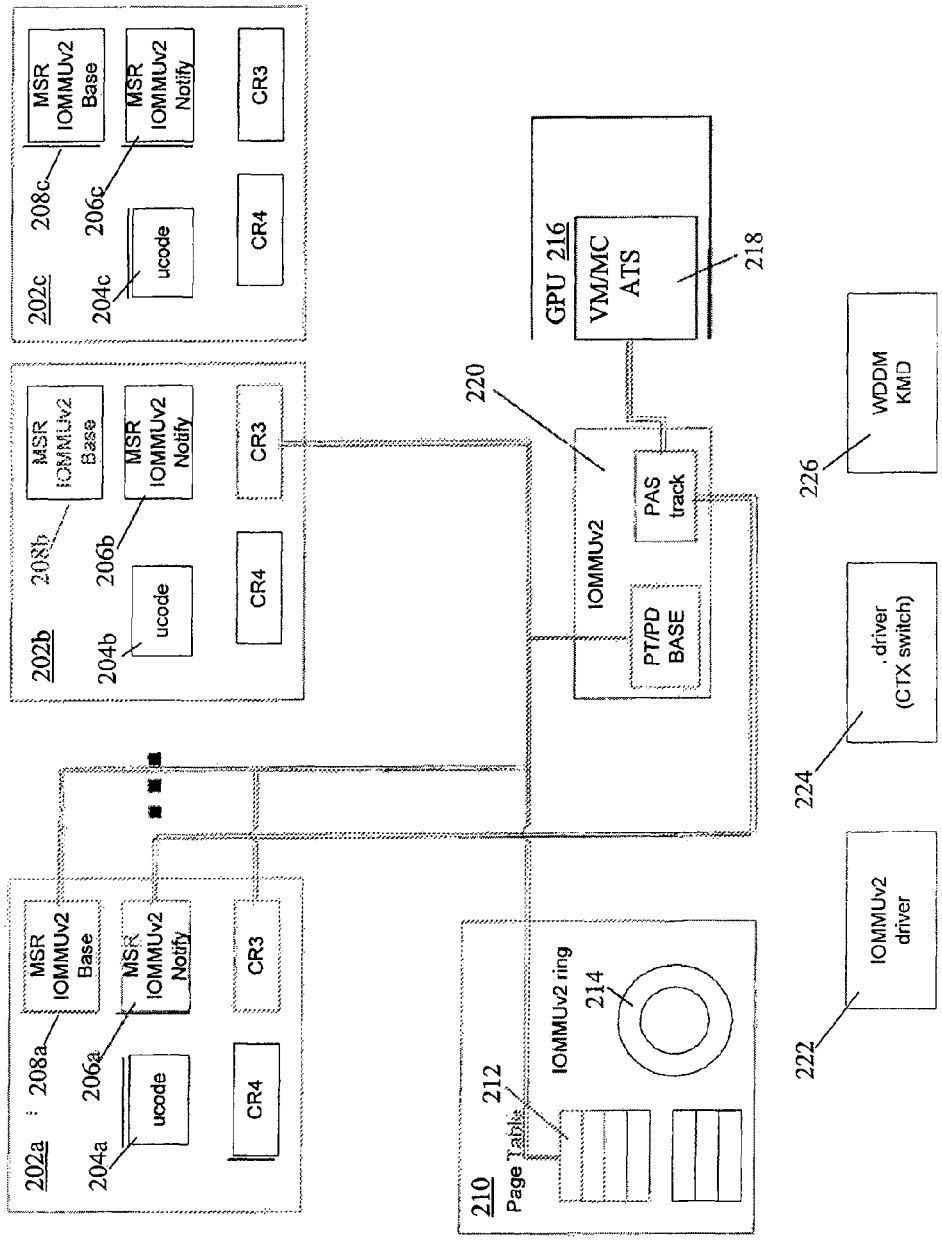
FIG. 2 is a block diagram of an illustrative system including components for supporting an IOMMUv2 in a legacy OS environment.

FIG. 2 outlines the various components relevant for the operation of the embodiments of the present invention. The components referenced in FIG. 2 are for illustrative purposes to provide the high-level control flow.

FIG. 2 provides a high level block diagram of the components of various embodiments of the present invention including a plurality of CPU cores 202a, 202b and 202c, a system memory 210, an IOMMUv2 220, an APD 216, and IOMMUv2 driver 222, a context switch driver 224, and a Windows Display Driver Model (WDDM) Kernel Mode Driver 226. In this illustrative embodiment, the CPU cores are each an x86 architecture core. Each of CPU cores 202a, 202b, and 202c include, respectively, a first machine specific register 208a, 208b, 208c for an IOMMUv2 base address; a second machine specific register 206a, 206b, 206c for an IOMMUv2 notification data; a microcode memory containing microcode 204a, 204b, 204c that when executed by the control hardware of the CPU core directs the communication of information to both first MSR 208a, 208b, 208c, and second MSR 206a, 206b, 206c; a first control register CR3 and a second control register CR4. Control registers CR3 and CR4 are compliant with the x86 architecture, and are involved in virtual address to physical address translation. It is noted that the present invention is not limited to any particular number of CPU cores.

FIG. 2 further shows a system memory 210, with a page table 212 and an IOMMUv2 ring buffer 214 disposed therein; an APD 216; an IOMMUv2 220; and a IOMMUv2 driver 222, a context switch driver 224, and a WDDM Kernel Mode Driver 226.

Various embodiments of the present invention achieve a close tie-in between CPU MMU and IOMMUv2, using the Page Table/Page Directory Base Address written to the CPU cores' CR3, and tightly monitor any TLB invalidations and changes of the PT/PD base address (PDBA/PTBA) "core residence" via the infrastructure provided in embodiments of the present invention. This is accomplished via CPU microcode changes and introducing a simple protocol between the CPU and IOMMUv2 and in succession IOMMUv2 and APD VM/ATS services to notify the relevant components.

When embodiments of the present invention determine that a TLB invalidation has occurred, either explicitly or implicitly, the IOMMUv2 is notified. TLB entries can be explicitly invalidated using operations intended for that purpose, or implicitly invalidated as a result of another operation. Generally, the CPU core manages the TLB transparently to software. TLB invalidation has no effect on the associated page-translation tables in memory. The CPU core invalidates the TLB whenever the CR3 register is loaded either explicitly or implicitly. After the TLB is invalidated, subsequent address references can consume many clock cycles until their translations are cached as new entries in the TLB.

Invalidation of TLB entries for frequently-used or critical pages can be avoided by specifying the translations for those pages as global. TLB entries for global pages are not invalidated as a result of a CR3 load. Global pages are invalidated using the INVLPG instruction. Three mechanisms are provided to explicitly invalidate the TLB. The invalidate TLB entry instruction (INVLPG) can be used to invalidate specific entries within the TLB. This instruction invalidates a page, regardless of whether it is marked as global or not. The Invalidate TLB entry in a specified ASID (INVLPGA) operates similarly, but operates on the specified ASID. Also, updates to the CR3 register cause the entire TLB to be invalidated except for global pages. The CR3 register can be updated with the MOV CR3 instruction. The CR3 register is also updated during a task switch, with the updated CR3 value read from the TSS of the new task. Finally, the TLB_CONTROL field of a VMCB can request specific flushes of the TLB to occur when the VMRUN instruction is executed on that VMCB.

On the CPU side, various embodiments of the present invention include two machine specific registers per core along with supporting CPU microcode. A first one of the two machine specific registers receives from the IOMMUv2 driver the "current" physical page table/page directory base address (PTBA/PDBA) that the IOMMUv2 hardware is using for the (combined CPU/APD architecture) process context. A second one of the two machine specific registers receives a physical address pointing the microcode to a location controlled by the IOMMUv2 hardware that will be able to receive writes that affect the IOMMU page table invalidations. This may be an actual physical register located in the IOMMUv2 device or may be an IOMMUv2 command ring write pointer that is in system memory.

In various embodiments, the CPU microcode uses the two machine specific registers described above as follows. CR3 updates via MOV CR3, <r>eax causes a microcode issued write notification through the "Notify" MSR address. Depending on whether the CR3 value written is equal or not equal to the "IOMMUv2 Base" MSR, different "messages" may be written.

If the first machine specific register, "IOMMUv2 Base" MSR, is equal to the CR3 value, then, in some embodiments, the microcode of the CPU core issues a write notification to the physical address stored in the first machine specific register, "IOMMUv2 Base" MSR, when certain conditions related to TLB invalidation are detected. More particularly, in some embodiments a microcode issued write notification through the second machine specific register, "Notify" MSR, address occurs when any of the CR0.PG bit (paging enable), the CR4.PAE bit (physical-address extensions), the CR4.PSE bit (page-size extensions) or CR4.PGE bit (page-global enable) are modified. In some embodiments, a microcode issued write notification through the second machine specific register, "Notify" MSR, address occurs when the XSAVE/XRSTR, INVLPG, INVLPGA instructions are executed. In some embodiments, a microcode issued write notification through the second machine specific register, "Notify" MSR, address occurs when entering SMM as a result of an SMI interrupt, or the RSM instruction is executed to return from SMM. In some embodiments, a microcode issued write notification through the second machine specific register, "Notify" MSR, address occurs when any other TLB invalidation condition happens. It is noted that TLB invalidation may occur explicitly or implicitly. Further examples of implicit invalidations include updating a memory-type range register (MTRR) with the WRMSR instruction, external initialization of the CPU, external masking of the A20 address bit (i.e., asserting the A20M# input signal), and writes to certain model-specific registers with the WRMSR instruction.

IOMMUv2 will receive the previously outlined CPU based TLB notifications (while "IOMMUv2 Base" MSR is equal to CR3), by some defined mechanisms as outlined above. As long as at least one CPU core runs a thread related to the process context of the combined CPU/APD architecture, the IOMMUv2 can leverage the page table invalidation information received in this way to keep the virtual address strictly in sync with the CPU core.

If, either due to an implicit or explicit CPU context switch and the previously mentioned microcode notification mechanism, the IOMMUv2 receives an indication that no CPU core is carrying the same PTBA in CR3 as the IOMMUv2 (this can be tracked by a refcount mechanism maintained in the IOMMUv2), then a global "page table invalidation" is issued, regardless of the actual page directory/page table memory content.

These conditions are forwarded by a hardware-based protocol to the APD VM to ensure that any invalidation is also tracked for the APD shader VM accesses to avoid accessing physical system memory based on stale data.

While this global invalidation will not allow APD system memory accesses while no CPU core has the PAS/PTBA resident, this limitation is generally acceptable due to the communication provided for in the combined CPU/APD architecture. The "APD management" threads use of an MWAIT will result in this thread remaining resident on a core for extensive amounts of time. In some embodiments, this amount of time may be up to and including as much time as OS scheduling policy allows for.

As outlined above, the APD needs to be aware of when an IOMMUv2 page invalidation occurs. Since a software-based approach may have too much latency, a hardware-based protocol is recommended for those cases where the PRI/ATS design does not provide a mechanism already.

Software Control Infrastructure and Context/Memory Management

APD Context Switch

Context switching between different contexts in the combined CPU/APD architecture is handled by a dedicated kernel mode software component that interacts with the IOMMUv2 driver, the WDDM KMD and OS memory management. It creates and manages a process/thread context state that relates to managing the APD context info and scheduling arbitrary contexts relative to WDDM scheduled workloads.

Handling of APD Page Faults

APD Page faults cause an IOMMUv2 Interrupt that is received by the IOMMUv2 driver. The IOMMUv2 driver will receive the interrupt, the PASID, and other supporting information, which will allow the driver to identify for which process context this page fault is targeted. The virtual address accessed is based on the process context. In order to resolve the page fault, the IOMMUv2 interrupt service routine (ISR) uses a Deferred_Procedure_Call( ), which in turn uses the KeStackAttachProcess( ) and some other Kernel Mode functions to execute a "resolver function" and let the CPU perform the memory access to that address/page in that function and process context, triggering the regular OS paging mechanism. It is noted that these are Windows specific functions and concepts, and are provided as examples and not limitations on the present invention. When the paging access has been satisfied, the APD execution will be restarted by the driver, which is accomplished by the IOMMUv2 driver communicating a "restart at address/context" with the previously described context switch management driver.

Figure 3:
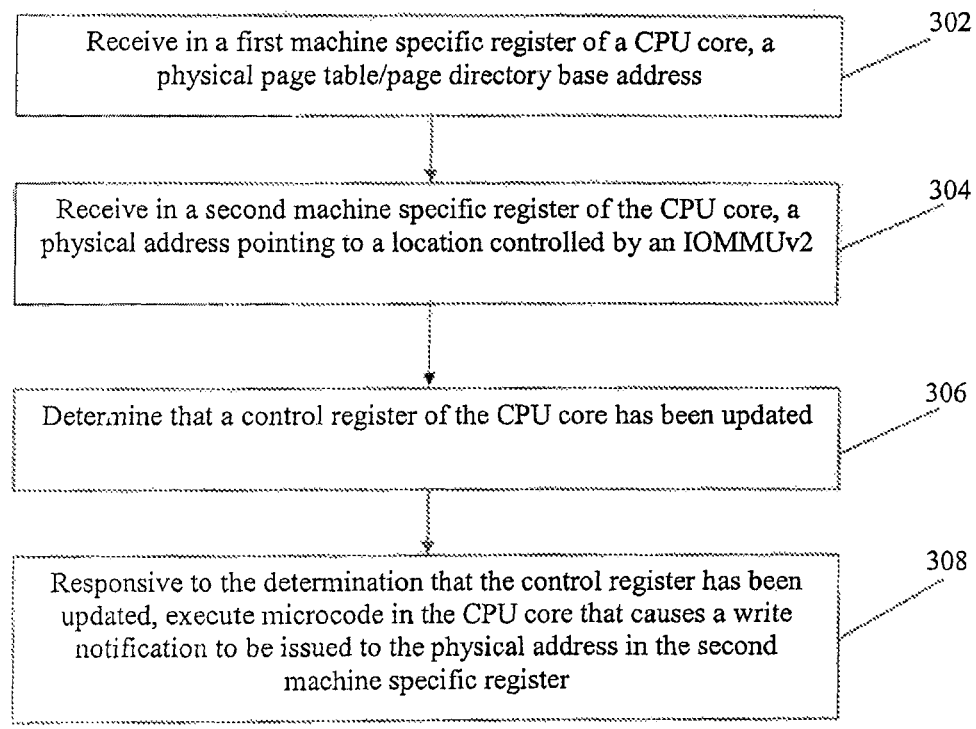
FIG. 3 is a flow diagram of an illustrative method of operating a combined CPU/APD architecture system with a legacy operating system which does not provide support for APD memory paging in a unified memory address space.

An illustrative method of operating a combined CPU/APD architecture system is shown in FIG. 3, and includes receiving 302 in a first machine specific register of a CPU core, a physical page table/page directory base address; receiving 304 in a second machine specific register of the CPU core, a physical address pointing to a location controlled by an IOMMUv2; determining 306 that a control register of the CPU core has been updated; and responsive to the determination that the control register has been updated, executing 308 microcode in the CPU core that causes a write notification to be issued to the physical address in the second machine specific register; wherein the location specified by the physical address is able to receive writes that affect IOMMUv2 Page Table invalidations.

In some embodiments the first machine specific register receives the physical page table/page directory base address which the IOMMUv2 is using at the time for its process context. In some embodiments the control register is one in which a physical page table/page directory base address is disposed. In some embodiments the current physical page table/page directory base address is received by the first machine specific register as a result of executing an IOMMUv2 driver.

In some embodiments the CPU core is an x86 core. In some embodiments a memory location corresponding to the physical address is located in a system memory, while in other embodiments the memory location corresponding to the physical address is located in the IOMMUv2. It is noted that generally the IOMMUv2 is communicatively coupled to an APD.

In some embodiments of the present invention, where the first machine specific register receives the physical page table/page directory base address which the IOMMUv2 is using at the time for its process context and where the control register is one in which a physical page table/page directory base address is disposed; the method of operating a combined CPU/APD architecture system further includes determining whether the physical page table/page directory base address in the first machine specific register and the physical page table/page directory base address in the control register are the same.

In some embodiments the control register is an x86 CR3 register. In some embodiments the method further includes receiving at the IOMMUv2 an indication that no CPU core is carrying the same page table base address in the control register as the IOMMUv2; and issuing, responsive thereto, a global page table invalidation. In some embodiments the write notification comprises a first message if the physical page table/page directory base address in the first machine specific register and the physical page table/page directory base address in the control register are the same.

In some embodiments, the write notification comprises a second message if the physical page table/page directory base address in the first machine specific register and the physical page table/page directory base address in the control register are not the same; and the first message and the second message are different from each other. Some embodiments track any invalidation for APD shader virtual memory accesses, and other embodiments determine whether one or more bits of a second CPU control register have been modified.

In some alternative embodiments, logic circuits are provided and operated, rather than executing microcode, in order to cause actions such as, but not limited to, issuing a write notification to a location controlled by an IOMMUv2.

It is noted that the present invention is not limited to the combination of x86 CPU cores with APDs, but is applicable to various CPU or instruction set architectures combined with APDs and sharing a unified address space as described herein.

Conclusion

The exemplary methods and apparatus illustrated and described herein find application in at least the fields of computers, graphics processing, and unified programming environments for heterogeneous computational resources.

It is to be understood that the present invention is not limited to the illustrative embodiments described above, but encompasses any and all embodiments within the scope of the subjoined Claims and their equivalents.

What is claimed is:

1. A method of operating a combined CPU/APD architecture system, comprising:
responsive to a determination that a control register of a CPU core has been updated, issuing a write notification to a location controlled by an IOMMUv2;
wherein the location controlled by the IOMMUv2 is configured to receive writes that affect IOMMUv2 page table invalidations.

2. The method of claim 1, further comprising:
receiving in a first machine specific register of a CPU core, a physical page table/page directory base address;
receiving in a second machine specific register of the CPU core, a physical address pointing to the location controlled by the IOMMUv2; and
determining that the control register of the CPU core has been updated.

3. The method of claim 2, wherein the first machine specific register receives the physical page table/page directory base address which the IOMMUv2 is using at the time for its process context.

4. The method of claim 2, wherein the control register is one in which a physical page table/page directory base address is disposed.

5. The method of claim 3, wherein the current physical page table/page directory base address is received by the first machine specific register as a result of executing an IOMMUv2 driver.

6. The method of claim 2, wherein the CPU core is an x86 core.

7. The method of claim 2, wherein the first machine specific register receives the physical page table/page directory base address which the IOMMUv2 is using at the time for its process context; wherein the control register is one in which a physical page table/page directory base address is disposed; and further comprising:
determining whether the physical page table/page directory base address in the first machine specific register and the physical page table/page directory base address in the control register are the same.

8. The method of claim 7, wherein the control register is an x86 CR3 register.

9. The method of claim 7, further comprising:
receiving at the IOMMUv2 an indication that no CPU core is carrying the same page table base address in the control register as the IOMMUv2; and
issuing, responsive thereto, a global page table invalidation.

10. The method of claim 7, wherein the write notification comprises a first message if the physical page table/page directory base address in the first machine specific register and the physical page table/page directory base address in the control register are the same.

11. The method of claim 7, wherein the write notification comprises a second message if the physical page table/page directory base address in the first machine specific register and the physical page table/page directory base address in the control register are not the same;
wherein the first message and the second message are different from each other.

12. The method of claim 2, wherein a memory location corresponding to the physical address is located in a system memory.

13. The method of claim 2, wherein a memory location corresponding to the physical address is located in the IOMMUv2.

14. The method of claim 2, wherein the IOMMUv2 is communicatively coupled to a graphics processing device.

15. The method of claim 9, wherein the IOMMUv2 is communicatively coupled to a graphics processing device; and further comprising:
tracking any invalidation for APD shader virtual memory accesses.

16. The method of claim 10, further comprising determining whether one or more bits of a second CPU control register have been modified.

17. A method of operating a combined CPU/APD architecture system, the CPU having a plurality of x86 cores, comprising:
determining, in a CPU core, that a TLB invalidation has occurred and that this invalidation is related to a page table/page directory the base address of which is stored in a first machine specific register of the CPU core; and
responsive to the determination that the TLB invalidation has occurred, executing microcode that causes a write notification to be issued to the location specified by a physical address in a second machine specific register.

18. The method of claim 17, further comprising:
receiving in the first machine specific register of the CPU core, a physical page table/page directory base address;
receiving in the second machine specific register of the CPU core, the physical address pointing to a location controlled by an IOMMUv2.

19. The method of claim 17, wherein executing the microcode is performed in the CPU core.

20. The method of claim 18, wherein the write notification comprises:
a first message; and
a second message if the physical page table/page directory base address in the first machine specific register and another physical page table/page directory base address in a CPU core control register in which physical page table/page directory base address information is disposed are not the same;
wherein the first message and the second message are different from each other.

* * * * *